UNITED STATES PATENT OFFICE

KARL HOLZACH, OF LUDWIGSHAFEN-ON-THE-RHINE, HANS KÄMMERER, OF MANNHEIM, AND WERNER MÜLLER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYESTUFFS CONTAINING CHROMIUM AND PROCESS OF MAKING

No Drawing. Application filed April 1, 1927, Serial No. 180,337, and in Germany April 15, 1926.

It is already known that dyestuffs containing chromium may be produced by treating dyestuffs, which contain chromable groups, with chromium compounds, and it has hitherto been the practice to employ the chromium compound in such an amount as to provide at least 1 atom of chromium for each chromable group in the dyestuff molecule.

We have now found that soluble dyestuffs containing chromium may be obtained, with different properties, by allowing chromium compounds, preferably compounds of trivalent chromium, to act on the dyestuffs containing chromable groups, in such proportions as to provide less than 1 atom of chromium to each chromable group in the dyestuff molecule. The dyestuffs, containing chromium which may be obtained in this way are particularly distinguished by the difference in their colour shade from that of the corresponding dyestuffs when prepared with larger amounts of chromium compound, while retaining the same excellent properties of the latter in respect to fastness. Thus, the dyeings obtained with the aforedescribed chromium compounds of azodyestuffs show practically no change of shade when acted upon for several minutes at 60° C. with a caustic soda solution containing from 1 to 3 grams of a caustic soda solution of 40° Bé. in each liter of water. The action of the chromium compound on the dyestuff may be brought about in various ways, as for example according to the existing method, and with or without the application of pressure; and also with the addition of a soluble mineral salt of a metal other than those which are known to form metal compounds with the dyestuff, as is described in the application for Letters Patent No. 151,255 of 1926.

The following examples will further illustrate how the said invention may be carried into practical effect but the invention is not limited to these examples. The parts are by weight.

Example 1

The diazo compound from 223 parts of 4-chlor-2-aminophenol-5-sulphonic acid is combined in the usual manner with 174 parts of 3-methyl-1-phenyl-5-pyrazolone in the presence of a caustic soda solution, and, after the coupling is completed, 200 parts of chromium hydroxide containing 26 per cent of $Cr_2O_3$ and 250 parts of an 85 per cent formic acid solution are added to the dyestuff pulp. The mixture is then heated to a temperature of 120° C. for from 3 to 4 hours, in a pressure vessel fitted with stirrers. The resulting chromium compound of the azo dyestuff is converted into the readily soluble sodium salt by treatment with a caustic soda solution. This salt gives pure red dyeings on wool from an acid bath. The free tinctorial acid crystallizes in well defined needles, with a green metallic luster, from a mixture of alcohol and water, which needles contain 2 atoms of chromium to 3 molecules of dyestuff. The corresponding dyestuff prepared, according to the previously known method, with larger amounts of chromium, contains 1 atom of chromium to each molecule of dyestuff, and dyes wool red shades with a decidedly more yellow tinge.

Example 2

40 parts of the dyestuff from the diazo compound of 4-nitro-2-aminophenol-6-sulphonic acid and betanaphthol are boiled with 500 parts of a solution of chromium formate, containing 4.2 parts of $Cr_2O_3$, for 20 hours under a reflux condenser. The salted-out and dried dyestuff gives black dyeings, of excellent fastness, on wool. Analysis reveals that the dyestuff containing chromium contains 2 atoms of chromium to every 3 molecules of dyestuff. The dyestuff containing chromium prepared according to the previously known method with double the amount of chromium, gives violet-brown dyeings on wool, and contains 1 atom of chromium to each molecule of dyestuff.

What we claim is:

1. The process of producing dyestuffs containing chromium which consists in treating an azo dyestuff free from chromium, but containing chromable groups with a chromium compound in such a proportion as to provide less than 1 atom of chromium to each chromable group in the dyestuff molecule.

2. The process of producing dyestuffs containing chromium which consists in treating an azo dyestuff containing chromable groups with a compound of trivalent chromium in such a proportion as to provide less than 1 atom of chromium to each chromable group in the dyestuff molecule.

3. As a new product, the complex chromium-containing compound of the chromable dyestuff having the probable formula

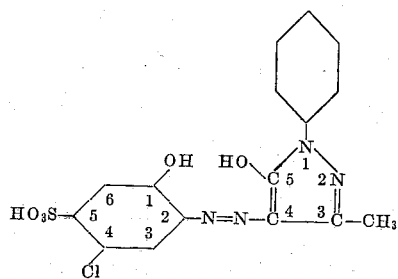

containing chromium in the proportion of substantially 2 atoms of chromium to 3 molecules of the chromable dyestuff, which complex, chromium-containing compound crystallizes in well-defined needles having a green, metallic luster and, in the form of its sodium salt, dyes wool from an acid bath pure red shades.

In testimony whereof we have hereunto set our hands.

KARL HOLZACH.
HANS KÄMMERER.
WERNER MÜLLER.